(12) United States Patent
Ahn et al.

(10) Patent No.: US 7,382,412 B2
(45) Date of Patent: Jun. 3, 2008

(54) ROTARY CAMERA ASSEMBLY OF MOBILE COMMUNICATION DEVICE

(75) Inventors: Sung-Woong Ahn, Seoul (KR); Sang-Hoon Shin, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 733 days.

(21) Appl. No.: 10/884,985

(22) Filed: Jul. 7, 2004

(65) Prior Publication Data

US 2005/0007489 A1    Jan. 13, 2005

(30) Foreign Application Priority Data

Jul. 8, 2003   (KR) ..................... 10-2003-0046151
Jul. 18, 2003  (KR) ..................... 10-2003-0049356

(51) Int. Cl.
    *H04N 5/225* (2006.01)
    *H04M 1/00* (2006.01)

(52) U.S. Cl. .................................. 348/373; 455/556.1

(58) Field of Classification Search ................ 348/373, 348/552, 14.02, 376; 248/274.1, 299.1; 455/556
    See application file for complete search history.

(56) References Cited

U.S. PATENT DOCUMENTS

| | | | | | |
|---|---|---|---|---|---|
| 6,476,289 | B1 * | 11/2002 | Buell et al. | .................. | 604/367 |
| 6,957,083 | B2 * | 10/2005 | Ikeda et al. | ............... | 455/556.1 |
| 7,184,092 | B2 * | 2/2007 | Lim | ........................... | 348/376 |
| 2003/0044001 | A1 | 3/2003 | Kim | ........................... | 379/441 |
| 2003/0109232 | A1 | 6/2003 | Park et al. | ...................... | 455/90 |
| 2004/0012701 | A1 * | 1/2004 | Nagai et al. | ............ | 348/333.12 |
| 2004/0023684 | A1 | 2/2004 | Sato et al. | ................ | 455/550.1 |
| 2004/0090552 | A1 * | 5/2004 | Watanabe et al. | ........... | 348/373 |

FOREIGN PATENT DOCUMENTS

| | | |
|---|---|---|
| EP | 1 267 576 A | 12/2002 |
| EP | 1267576 | 12/2002 |
| JP | 8-223492 | 8/1996 |
| JP | 11-312050 | 11/1999 |
| JP | 2002-111834 | 4/2002 |
| JP | 2002-372036 | 12/2002 |
| JP | 2003-189142 | 7/2003 |
| JP | 2003-262913 | 9/2003 |
| JP | 2004-04175 | 2/2004 |
| JP | 2004-040176 | 2/2004 |
| KR | 2003-0047105 | 6/2003 |
| WO | WO02/082674 | 10/2002 |
| WO | WO 02/082674 | 10/2002 |
| WO | WO02/104008 | 12/2002 |

* cited by examiner

*Primary Examiner*—Ngoc-Yen Vu
*Assistant Examiner*—Peter Chon
(74) *Attorney, Agent, or Firm*—Ked & Associates, LLP

(57) ABSTRACT

A rotary camera assembly of a mobile communication device is provided that may include a camera supporting member, a camera, a rotation boss, a rack portion and a belt. The camera supporting member may be installed at a hinge portion of the mobile communication device. The camera may be rotatably installed in the camera supporting member. The rotation boss may be formed at a side of the camera. The rack may be formed at a side of the camera supporting member. The belt may connect the rotation boss and the rack portion so as to maintain a rotation angle of the camera.

9 Claims, 12 Drawing Sheets

ROTARY CAMERA ASSEMBLY OF MOBILE COMMUNICATION DEVICE

The present application claims priority from Korean Patent Application Nos. 46151/2003, filed Jul. 8, 2003 and 49356/2003, filed Jul. 18, 2003, the subject matters of which are incorporated herein by reference.

BACKGROUND OF THE INVENTION

1. Field of the Invention

Embodiments of the present invention may relate to a rotary camera assembly. More particularly, embodiments of the present invention may relate to a rotary camera assembly of a mobile communication device installed at a hinge portion of the mobile communication device.

2. Background of Related Art

A mobile communication device may transmit not only voice or data but may also provide multimedia functions and/or Internet functions. A mobile communication device having a camera may also transmit/receive images photographed by the camera.

The mobile communication device may be any one of a body mounted type, a folder mounted type, and a hinge mounted type, for example, according to a mounted position of a camera on the device. The hinge mounted type can obtain a rotation angle (i.e., a photographic angle) of a camera more widely and thus the hinge mounted type may be used more often. As such, the hinge mounted type of mobile communication device will be explained below. The term mobile communication device may include a mobile telephone (i.e., a cellular telephone), a personal communication system (PCS), a personal digital assistant (PDA), and/or other devices having a wireless communication function, for example.

Figure 1:
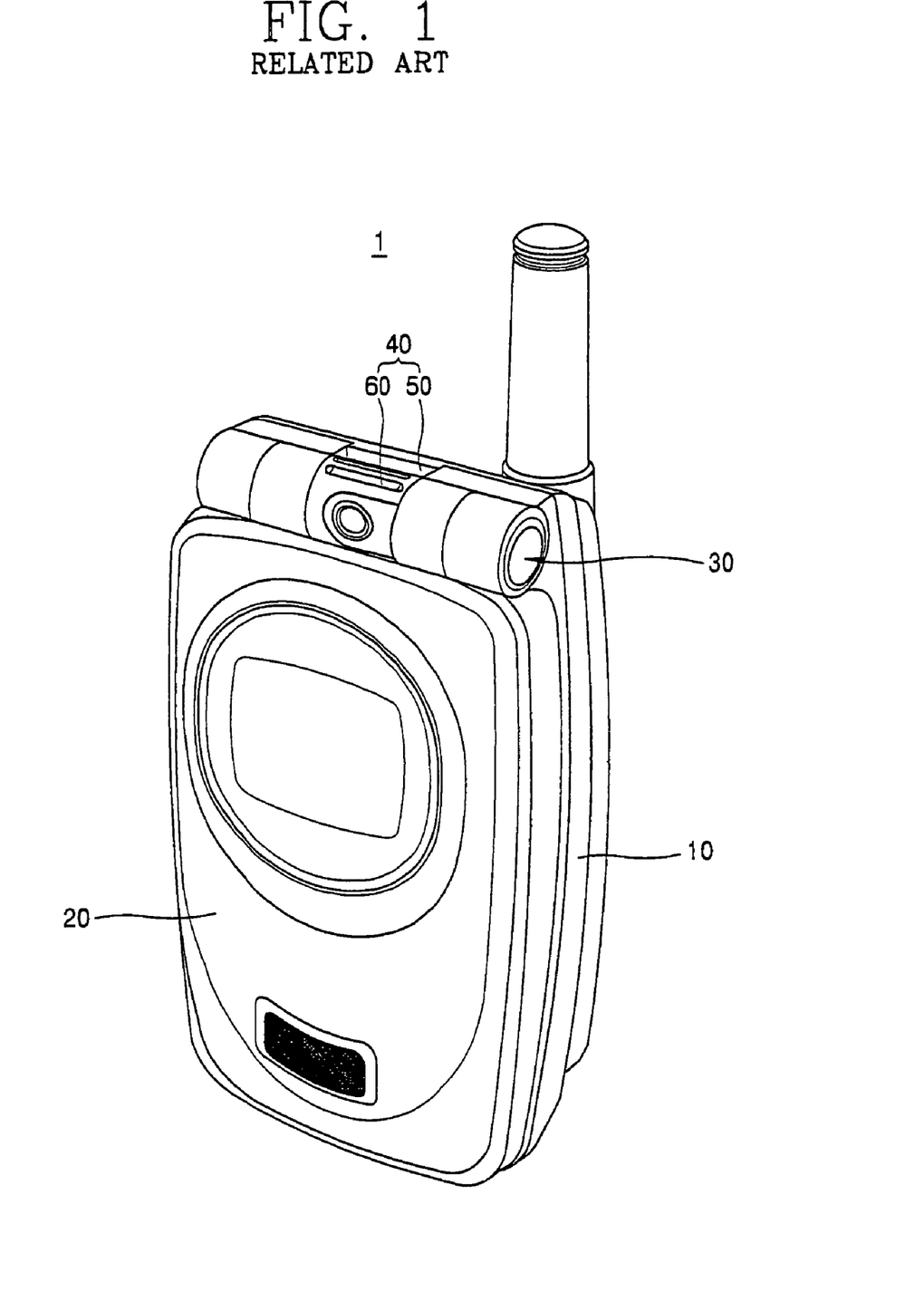
FIG. 1 is a perspective view showing a mobile communication device having a rotary camera according to an example arrangement.
Figure 2:
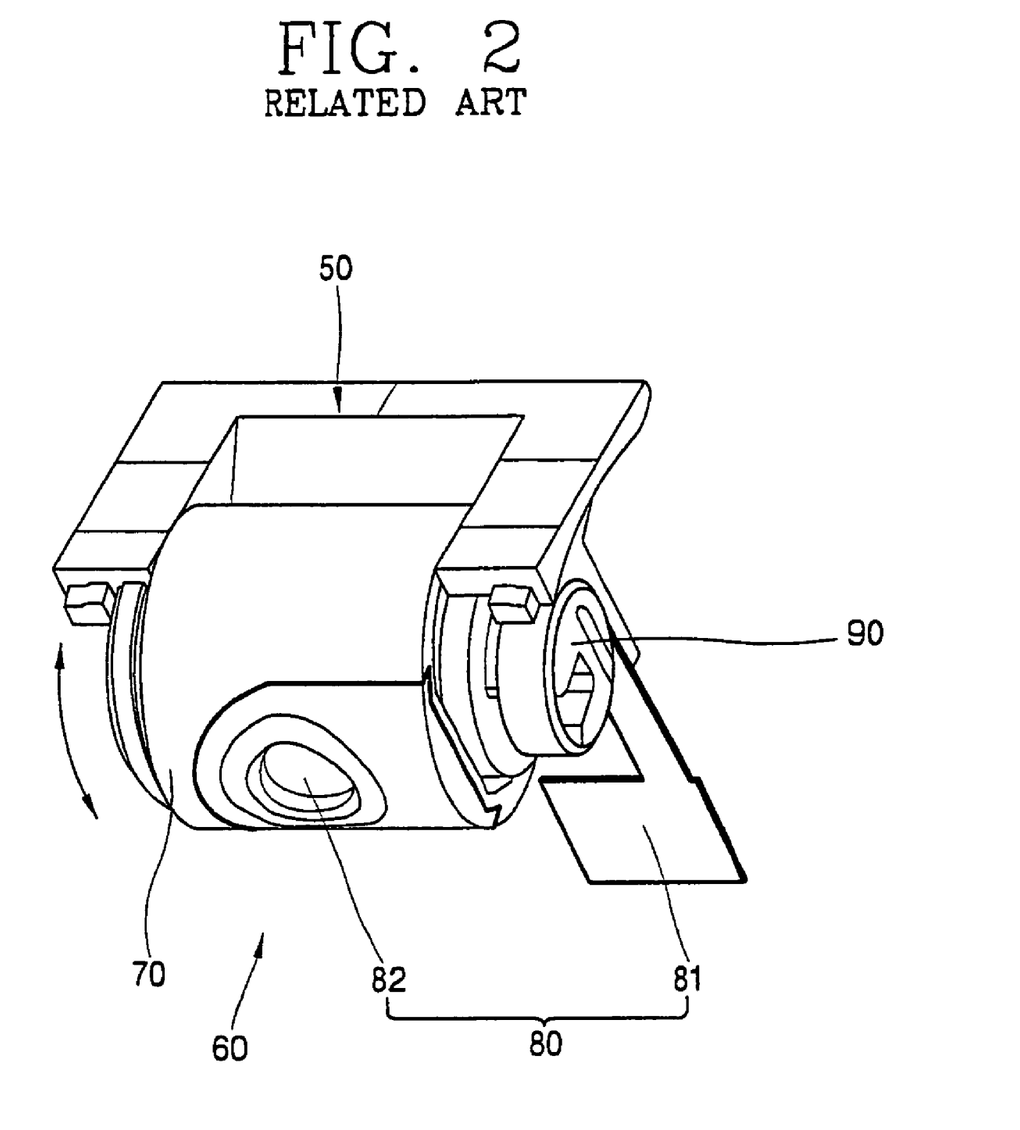
FIG. 2 is an engagement perspective view showing a rotary camera assembly of a mobile communication device according to an example arrangement.
Figure 3:
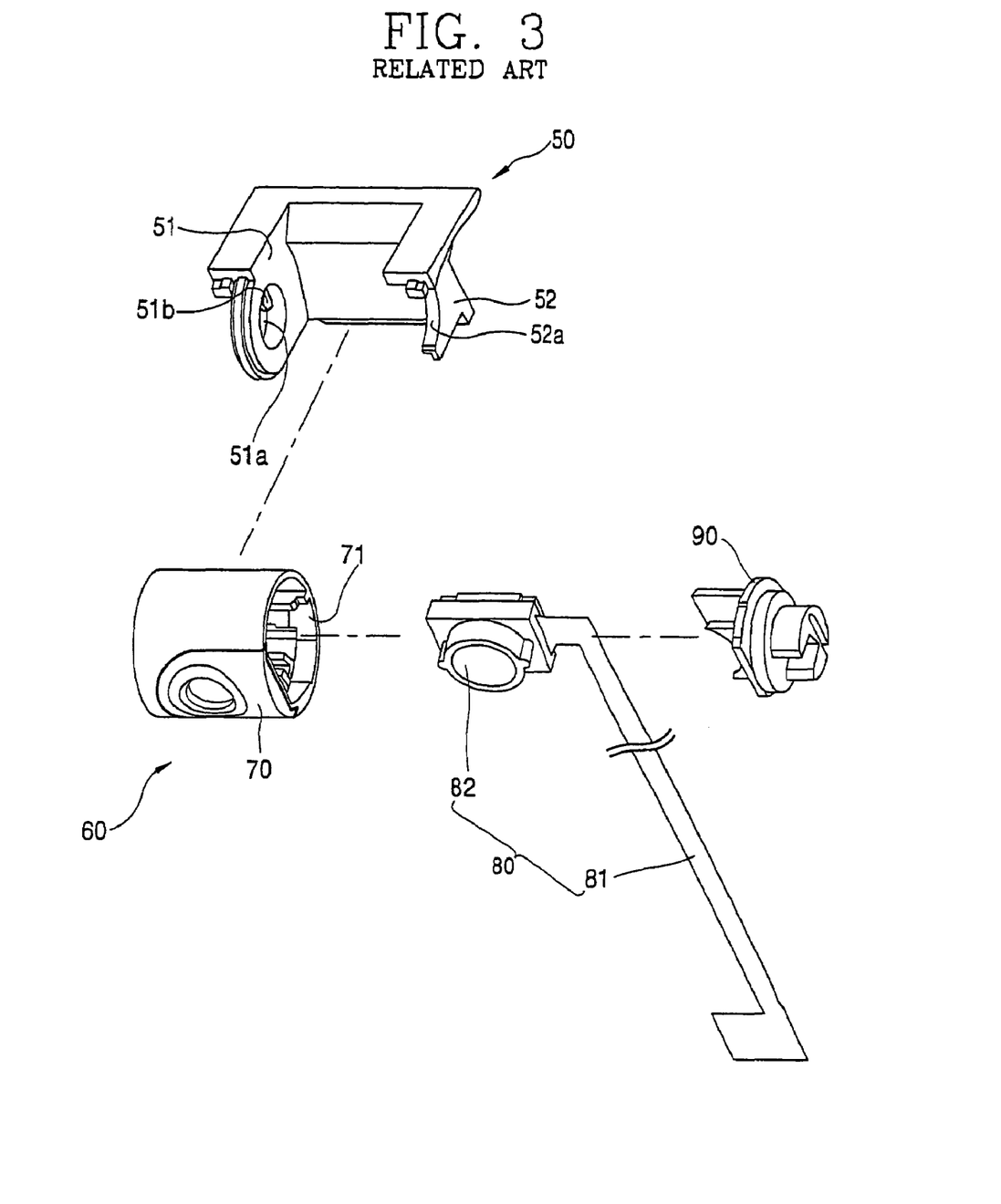
FIG. 3 is a disassembled perspective view showing the rotary camera assembly of a mobile communication device according to an example arrangement.
Figure 4:
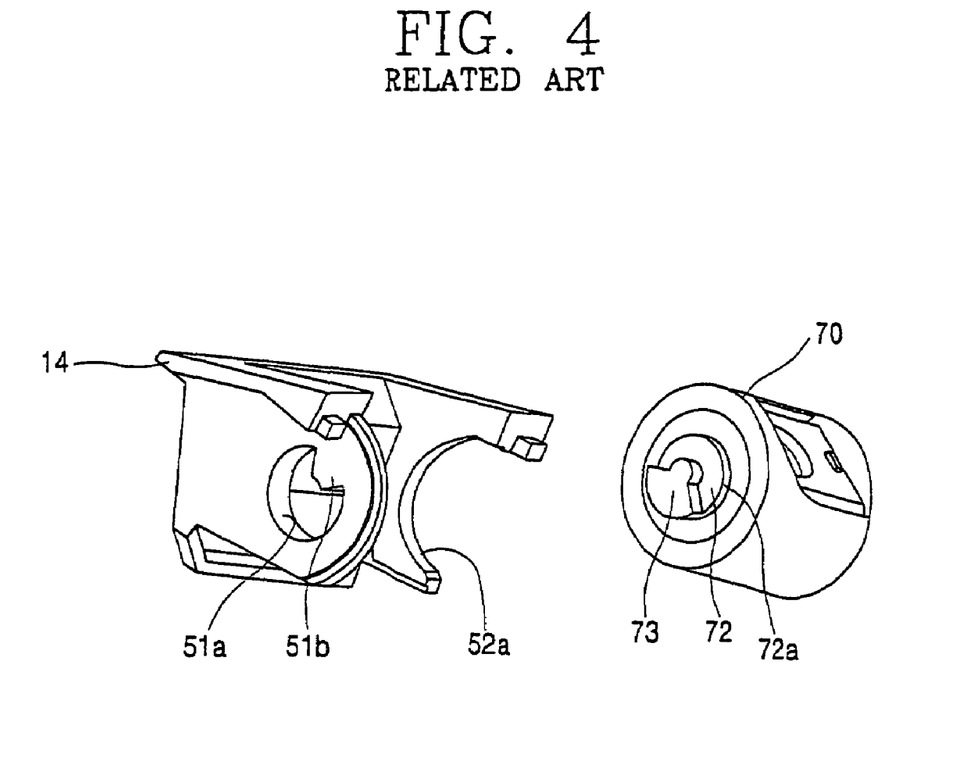
FIG. 4 is a disassembled perspective view showing a stopper of a supporting member and a jaw of a camera housing in the mobile communication device according to an example arrangement.
Figure 5:
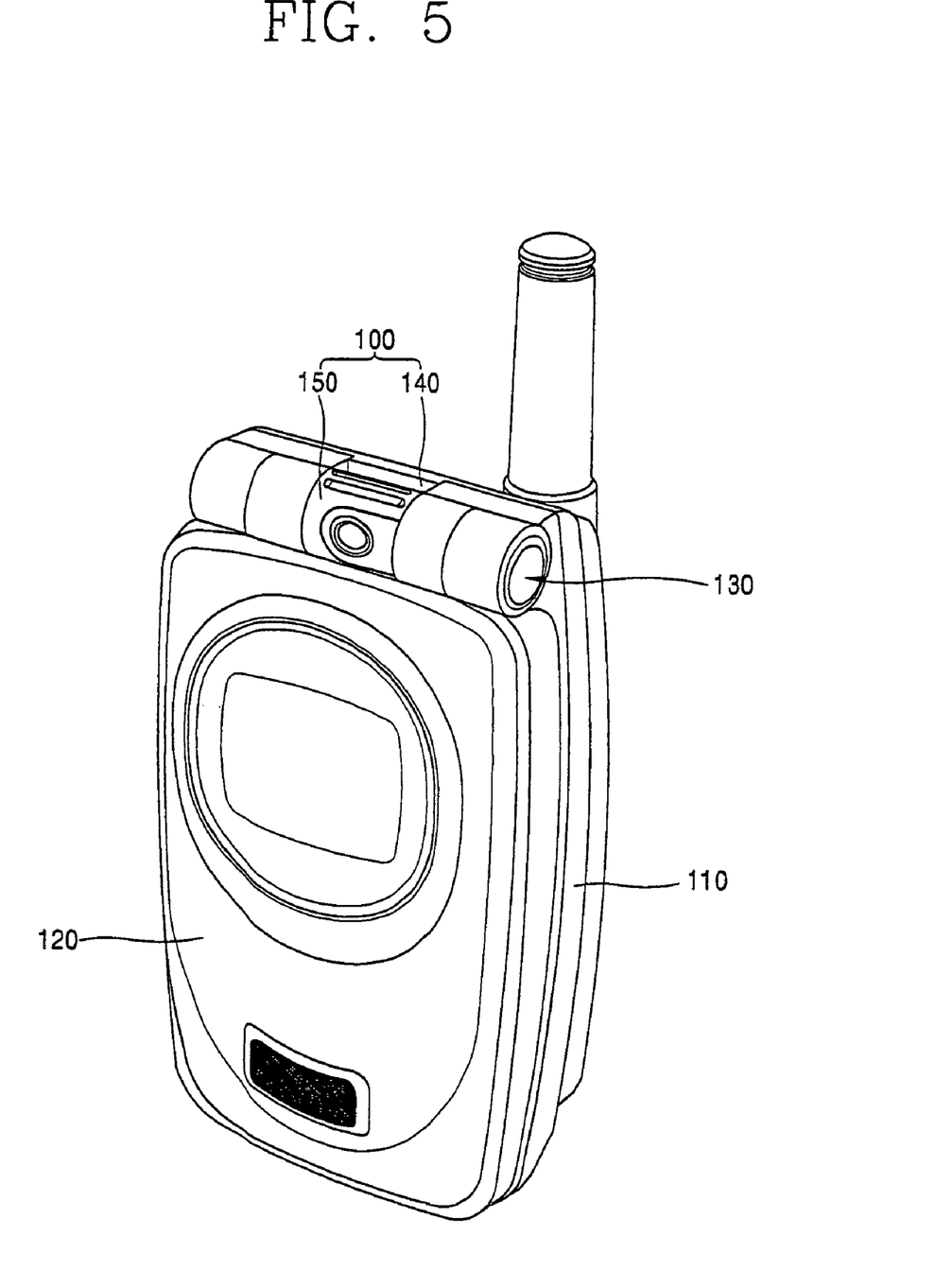
FIG. 5 is a perspective view showing a mobile communication device according to an example embodiment of the present invention.
Figure 6:
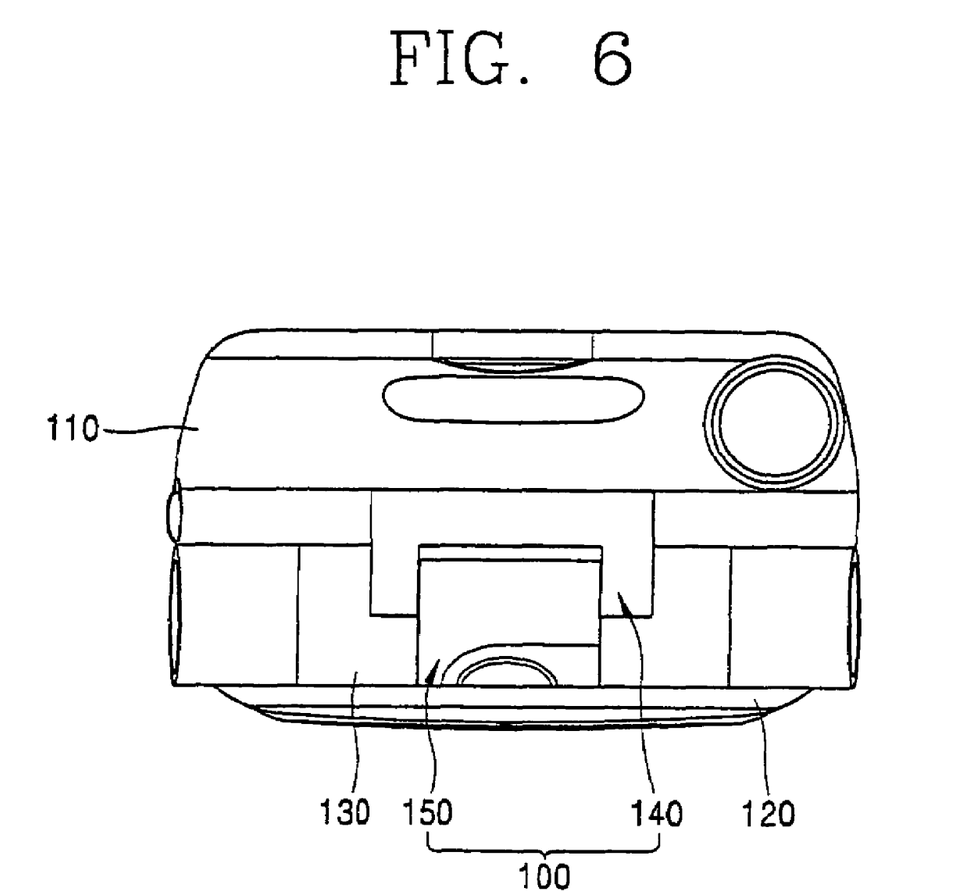
FIG. 6 is a plane view of FIG. 5.

FIG. 1 is a perspective view showing a mobile communication device having a rotary camera according to an example arrangement. FIG. 2 is an engagement perspective view showing a rotary camera assembly of a mobile communication device according to an example arrangement. FIG. 3 is a disassembled perspective view showing the rotary camera assembly of a mobile communication device according to an example arrangement. FIG. 4 is a disassembled perspective view showing a stopper of a bushing and a jaw of a camera housing according to an example arrangement. Other arrangements are also possible.

As shown in FIG. 1, the mobile communication device 1 may include a communication device body 10, a folder 20 rotatably installed to the communication device body 10 by a hinge portion 30, and a camera assembly 40 installed at or in the hinge portion 30.

As shown in FIGS. 2 to 4, the camera assembly 40 may include a bushing 50 coupled to one side of the hinge portion 30, and a camera 60 rotatably installed in the bushing 50. A first supporting portion 51 may be formed at one side of the bushing 50 and a second supporting portion 52 may be formed at the other side.

A rotational shaft inserting hole 51a may be formed at one side of the first supporting portion 51, and a stopper 51b may be formed at an inner circumferential surface of the rotational shaft inserting hole 51a. A cap supporting surface 52a may have a circular arc shape and may be formed at the second supporting portion 52.

The camera 60 may include a cylindrical camera housing 70 rotatably installed in the bushing 50, a camera module 80 installed in the camera housing 70 having a flexible printed circuit board (FPCB) 81 and a lens 82, and a cap 90 coupled to an opening 71 of the camera housing 70. The FPCB 81 may be wound on the cap 90 more than one time so as to be coupled to a main PCB (not shown) of the mobile communication device body 10 (FIG. 1).

On one side of the camera housing 70, a stepping portion 73 having a fan shape may be formed at a rotational shaft 72. The rotational shaft 72 may be inserted into the rotational shaft inserting hole 51a, and the cap 90 coupled to the camera housing 70 may be supported at a cap supporting surface 52a of the bushing 50. Accordingly, the camera 60 may rotate around (or about) the rotational shaft 72.

When the camera 60 is rotated, the jaw 51b may be stopped by the stopper 51b of the bushing 50. Accordingly, the camera 60 may be rotated only within a preset angle range around (or about) the rotational shaft 72.

Due to an elastic reinforcing force of the FPCB 81 wound on the cap 90, a rotation angle of the camera 60 may be arbitrarily changed even after the user adjusts the camera rotation angle (or a photographic angle). To prevent this, the entire outer circumferential surface 72a of the rotational shaft 72 may be in surface contact with the inner circumferential surface of the rotational shaft inserting hole 51a.

However, in the rotary camera assembly of the mobile communication device, the outer circumferential surface of the rotational shaft may not be properly in contact with the inner circumferential surface of the rotational shaft inserting hole due to abrasion or assembly tolerance based on long time use.

When the outer circumferential surface of the rotational shaft is not in proper contact with the inner circumferential surface of the rotational shaft inserting hole, the camera may not rotate with uniform tension. Accordingly, a rotation angle of the camera adjusted by the user may be arbitrarily changed by the elastic reinforcing force of the FPCB. When the rotation angle of the camera adjusted by the user is arbitrarily changed, the user cannot precisely photograph his desired image and thus the final product may be degraded.

SUMMARY OF THE INVENTION

Embodiments of the present invention may provide a camera assembly of a mobile communication device capable of precisely and minutely adjusting a rotation angle of a camera by a user and maintaining the rotation angle of the camera even after the adjustment.

A rotary camera assembly of a mobile communication device is provided that includes a camera supporting member installed at one side of a mobile communication device, a camera rotatably installed in the camera supporting member and a camera rotation angle maintaining device to maintain a rotation angle of the camera. For example, the camera rotation angle maintaining device may include a rotation boss formed at a center of a lateral surface of the camera, a rack portion formed at a side of a lateral surface of the camera supporting member, and a belt for connecting the rotation boss and the rack portion.

As another example, the camera rotation angle maintaining device may include an opening portion formed at the camera supporting member and a pressurizing roller axially installed at the opening portion to be pressurized against an outer circumferential surface of the camera.

Other objects, features, aspects, advantages and embodiments of the present invention may become more apparent from the following detailed description of the present invention when taken in conjunction with the accompanying drawings.

BRIEF DESCRIPTION OF THE DRAWINGS

The accompanying drawings are included to provide a further understanding of the invention and are incorporated in and constitute a part of this specification. The drawings illustrate arrangements and embodiments of the invention and together with the description serve to explain the principles of the invention.

The following represents brief descriptions of the drawings in which like reference numerals refer to like elements and wherein.

DETAILED DESCRIPTION OF PREFERRED EMBODIMENTS

As shown in FIGS. 5 to 9, a camera assembly 100 of a mobile communication device according to example embodiments of the present invention may include a camera supporting member 140, a camera 150 and a camera rotation angle maintaining device 160. The camera supporting member 140 may be installed at one side of a hinge portion 130 formed between a mobile communication device body 110 and a folder 120. The camera 150 may be rotatably installed in the camera supporting member 140. The camera rotation angle maintaining device 160 may maintain a rotation angle of the camera 150 after adjustment by a user.

Figure 7:
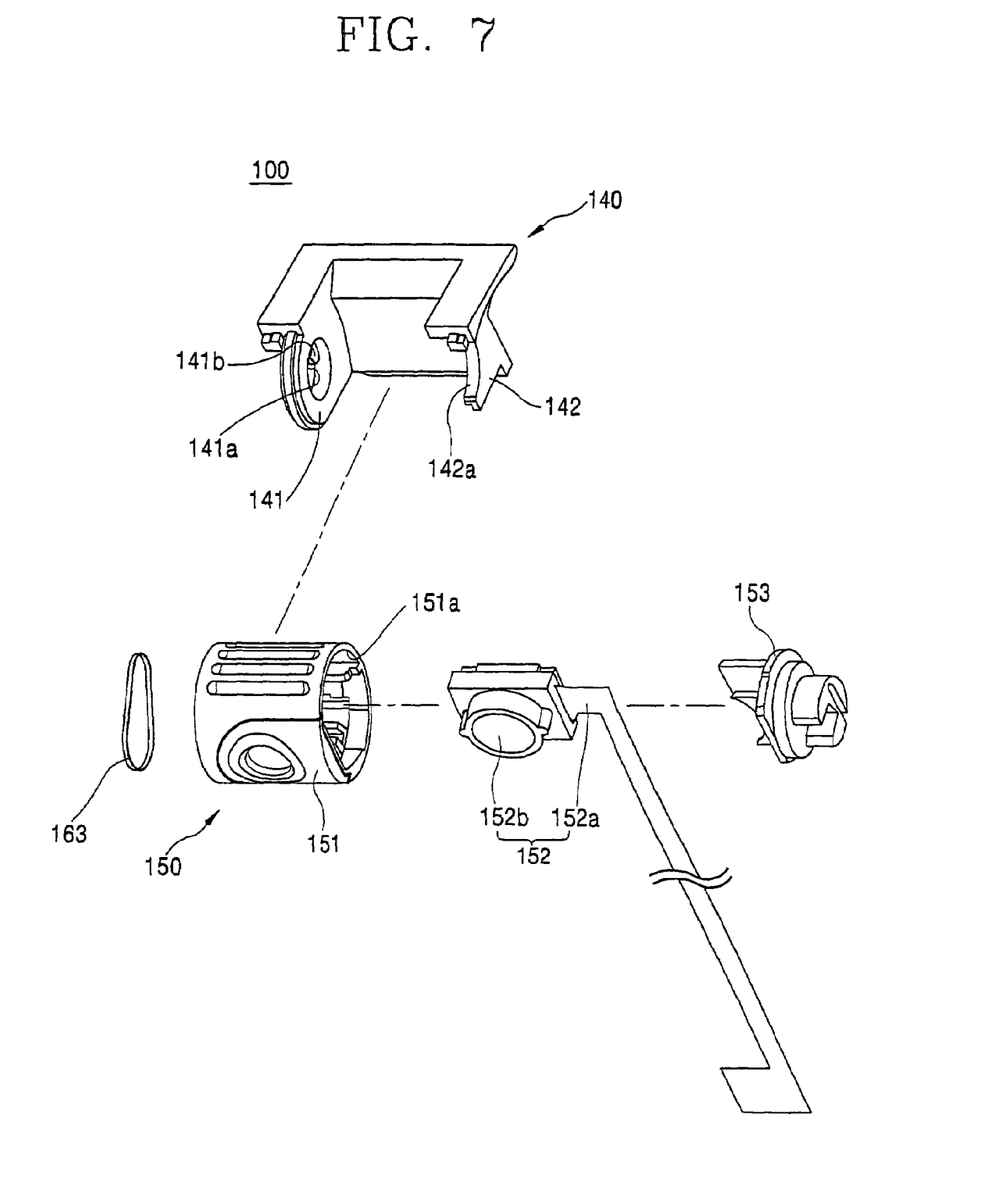
FIG. 7 is a disassembled perspective view showing a camera assembly of the mobile communication device according to an example embodiment of the present invention.

The camera supporting member 140 may be coupled to one side of the hinge portion 130 by being fitted thereto, and the camera 150 may be rotatably coupled to an inside of the camera supporting member 140.

A first supporting portion 141 may be formed at one side of the camera supporting member 140 and a second supporting portion 142 may be formed at the other side. A rotational shaft inserting hole 141a may be formed at the first supporting portion 141, and a stopper 141b having a fan shape may be formed at an inner circumferential surface of the rotational shaft inserting hole 141a. The second supporting portion 142 may have a circular arc shape and may have a cap supporting surface 142a.

The camera 150 may include a cylindrical camera housing 151, a camera module 152 and a cap 153. The cylindrical camera housing 151 may have a rotational shaft 151b at one side. The camera module 152 may be installed in the camera housing 151 and have a flexible printed circuit board (FPCB) 152a and a lens 152b. The cap 153 may be coupled to an opening 151a of the camera housing 151.

The rotational shaft 151b formed at one side of the camera housing 151 may be inserted into the rotational shaft inserting hole 141a of the camera supporting member 140. The cap 153 may be supported at the cap supporting surface 142a of the camera supporting member 140. Accordingly, the camera 150 may be rotated.

When the camera 150 is rotated, a jaw 151c of the camera housing 151 may be stopped by the stopper 141b of the camera supporting member 140 and thereby the camera 150 is rotated only within a preset angle range.

Figure 8:
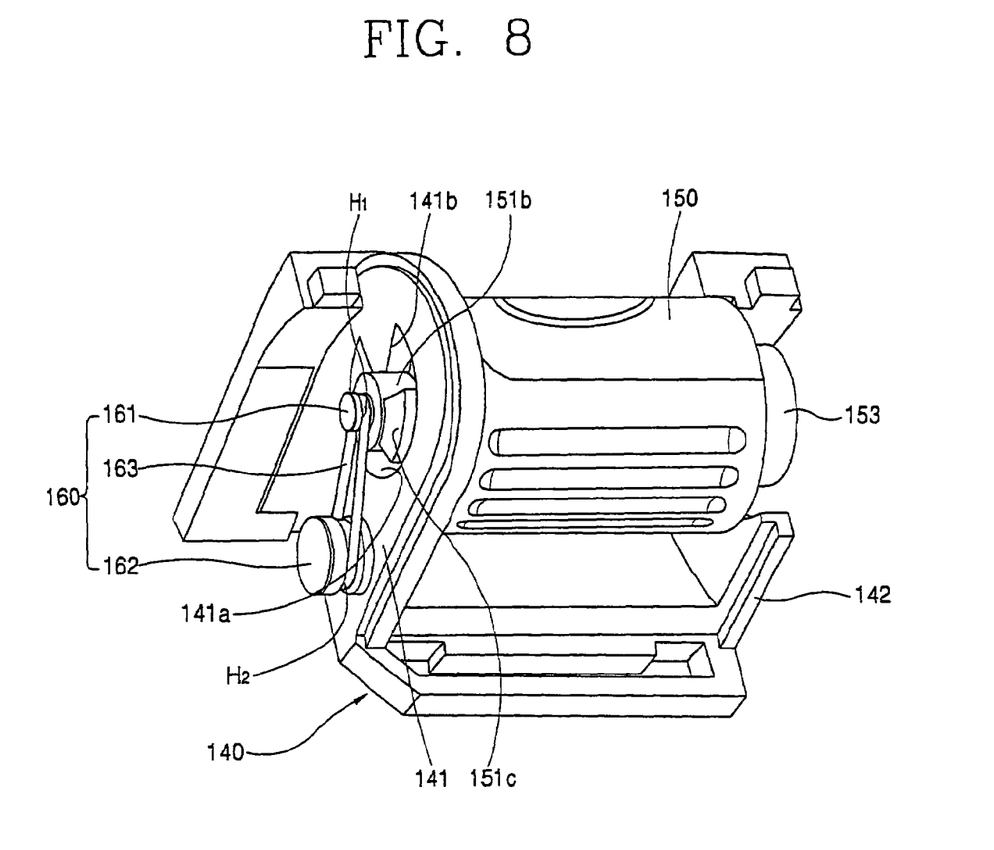
FIG. 8 is an engagement perspective view showing the camera assembly of the mobile communication device according to an example embodiment of the present invention.
Figure 9:
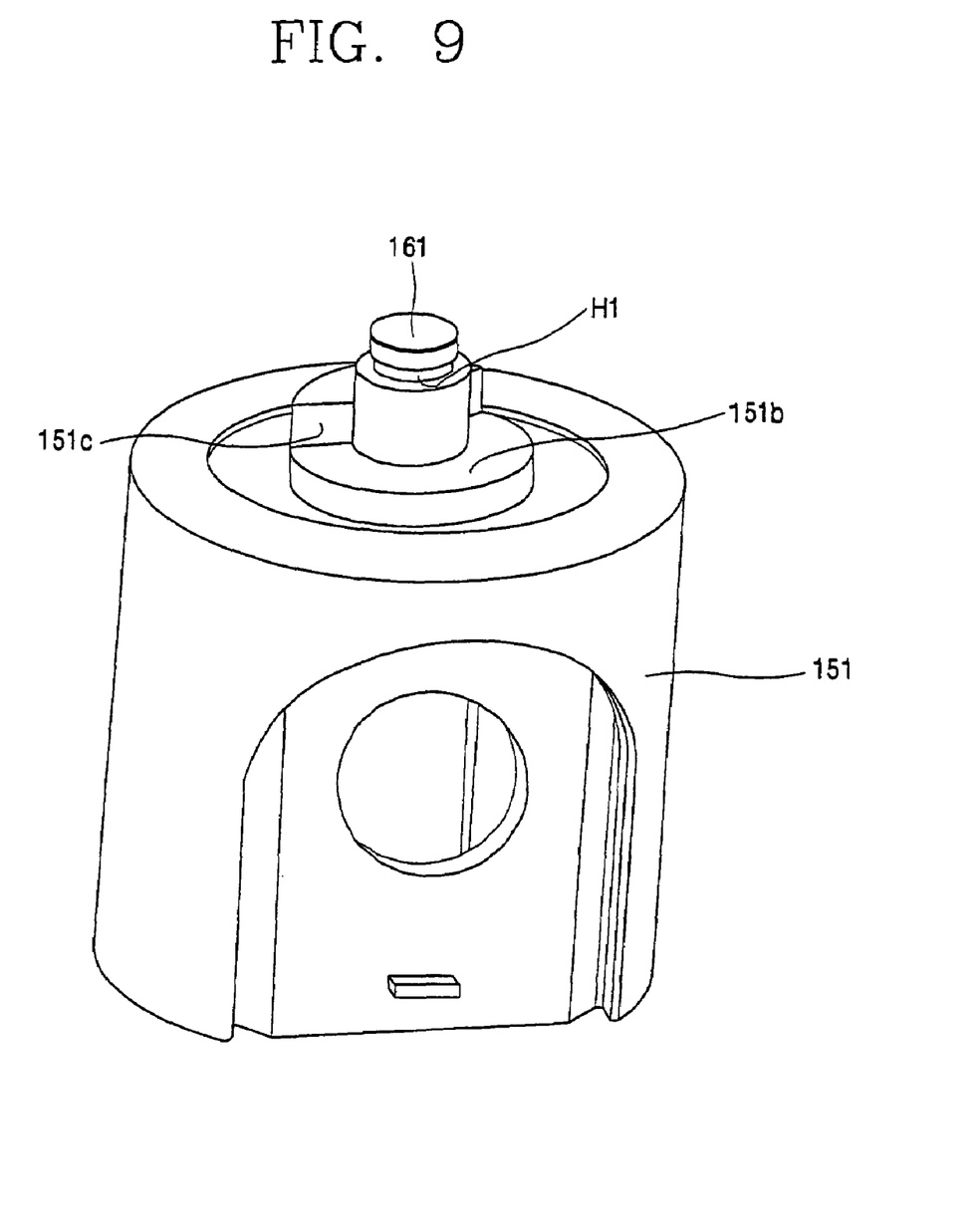
FIG. 9 is a perspective view showing a camera housing of the camera assembly of the mobile communication device according to an example embodiment of the present invention.

The camera rotation angle maintaining device 160 may include a rotation boss 161, a roll type rack portion 162 and a belt 163. The rotation boss 161 may be formed at a lateral surface of the camera housing 151 (i.e., at the first supporting portion 141). The roll type rack portion 162 may be formed at a lateral surface of the camera supporting member 140. The belt 163 may connect (or couple) the rotation boss 161 and the rack portion 162.

The rotation boss 161 may extend from the center of the rotational shaft 151b. The rotation boss 161 may be integrally molded with the rotational shaft 151b.

Belt inserting grooves H1 and H2 may be formed at outer circumferential surfaces of the rotation boss 161 and the rack portion 162, respectively, in a circumferential direction. The belt 163 may be fitted into the belt inserting grooves H1 and H2. Since the belt inserting grooves H1 and H2 and the belt 163 have a sectional surface of a "V" shape, the belt 163 may not be easily detached from the belt inserting grooves H1 and H2.

Accordingly, since the belt 163 connects the rotation boss 161 and the rack portion 162 maintaining a certain tension, the camera 150 may be rotated maintaining a certain tension. Additionally, a rotation angle of the camera 150 adjusted by the user may be maintained without being arbitrarily changed when the user adjusts a rotation angle of the camera 150.

An oil-less lubrication coating (not shown) may be provided on the surface of the belt inserting groove H2 of the rack portion 162 for smooth rotation of the belt 163. The oil-less lubrication coating is a technique applied to an oil-less bearing and for coating a material such as a black lead on the surface of the belt inserting grooves H1 and H2.

Operation of the camera assembly of the mobile communication device according to example embodiments of the present invention will now be explained with reference to FIGS. 5 to 9.

When the user rotates the camera 150 to a desired angle in order to adjust a rotation angle of the camera 150, the camera 150 is rotated to a certain angle centered around (or about) the rotational shaft 151b. At the same time, the rotation boss 161 integrally formed with the rotational shaft 151b may be rotated in the same direction as the rotational shaft 151b. The belt 163 connecting the rotation boss 161 and the rack portion 162 may slip due to the oil-less lubrication coating of the belt inserting grooves H1 and H2 thereby to be rotated in the same direction as the rotational shaft 151b.

Since the belt 163 connects the rotation boss 161 and the rack portion 162 maintaining a certain tension, the camera 150 may be rotated slowly and smoothly. Accordingly, a rotation angle of the camera 150 adjusted by the user may be maintained.

As shown in FIGS. 10 to 13, a rotary camera assembly 200 of a mobile communication device according to example embodiments of the present invention may include a camera 250 and a camera rotation angle maintaining device 260. The camera 250 may be rotatably installed in a camera supporting member 240. The camera rotation angle maintaining device 260 may maintain a rotation angle of the camera 250 that was adjusted by the user.

Figure 10:
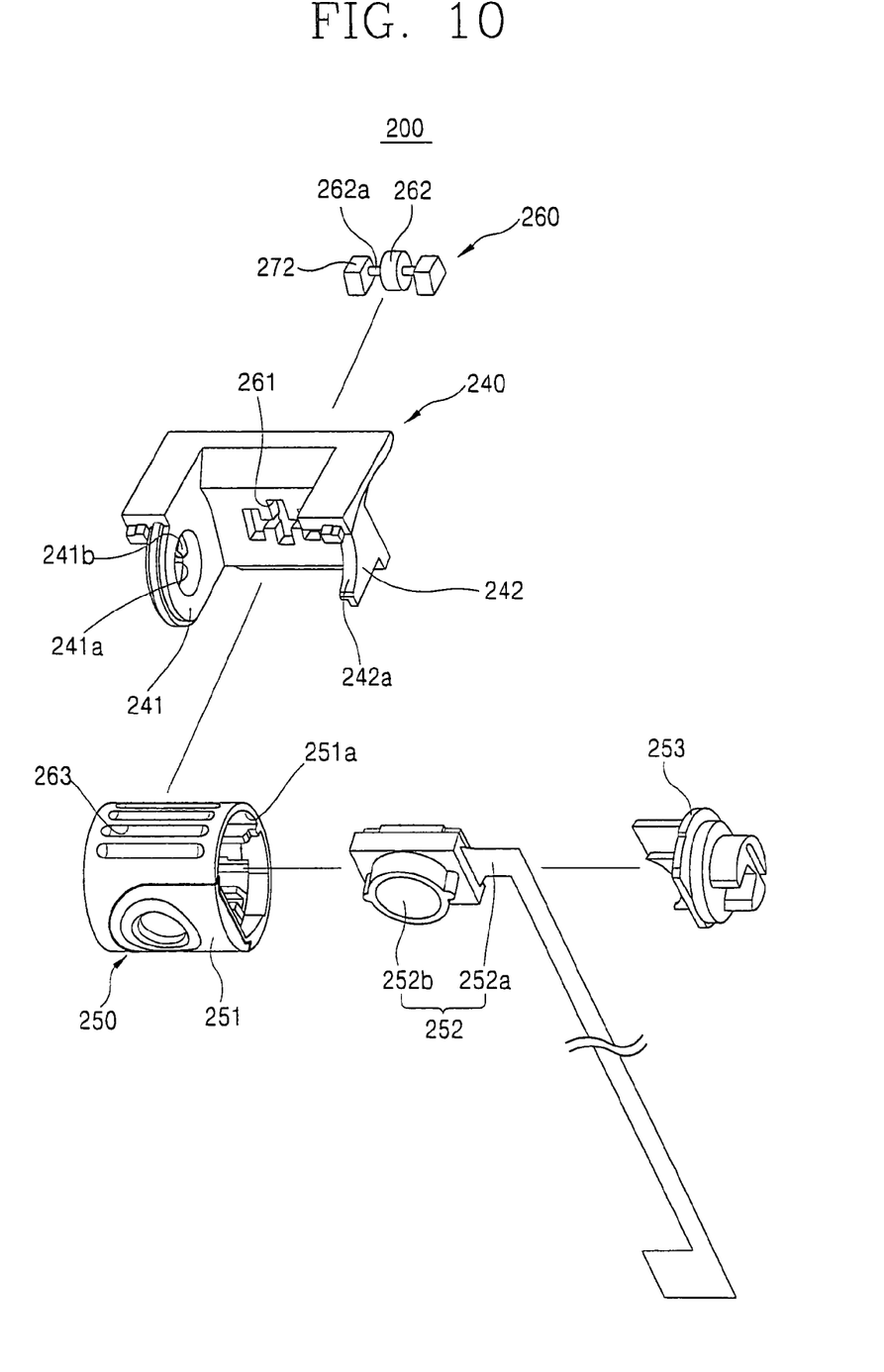
FIG. 10 is a disassembled perspective view showing a camera assembly of a mobile communication device according to an example embodiment of the present invention.

The camera supporting member 240 may be coupled to one side of the hinge portion of the body by being fitted thereto as discussed above. The camera 250 may be rotatably coupled to an inside of the camera supporting member 240.

A first supporting portion 241 may be formed at one side of the camera supporting member 240 and a second supporting portion 242 may be formed at another side thereof. A rotational shaft inserting hole 241a may be formed at the first supporting portion 241 and a stopper 241b having a fan shape may be formed at an inner circumferential surface of the rotational shaft inserting hole 241a. The second supporting portion 242 may have a circular arc shape and may be provided with a cap supporting surface 242a.

The camera 250 may include a cylindrical camera housing 251, a camera module 252 and a cap 253. The cylindrical camera housing 251 may have a rotational shaft 251b and a jaw 251c of a fan shape. The camera module 252 may be installed in the camera housing 251 and have a flexible printed circuit board (FPCB) 252a and a lens 252b. The cap 253 may be coupled to an opening 251a of the camera housing 251.

The rotational shaft 251b of the camera housing 251 may be inserted into the rotational shaft inserting hole 241a of the camera supporting member 240. The cap 253 may be supported at the cap supporting surface 242a of the camera supporting member 240. Accordingly, the camera 250 may be rotated.

Figure 11:
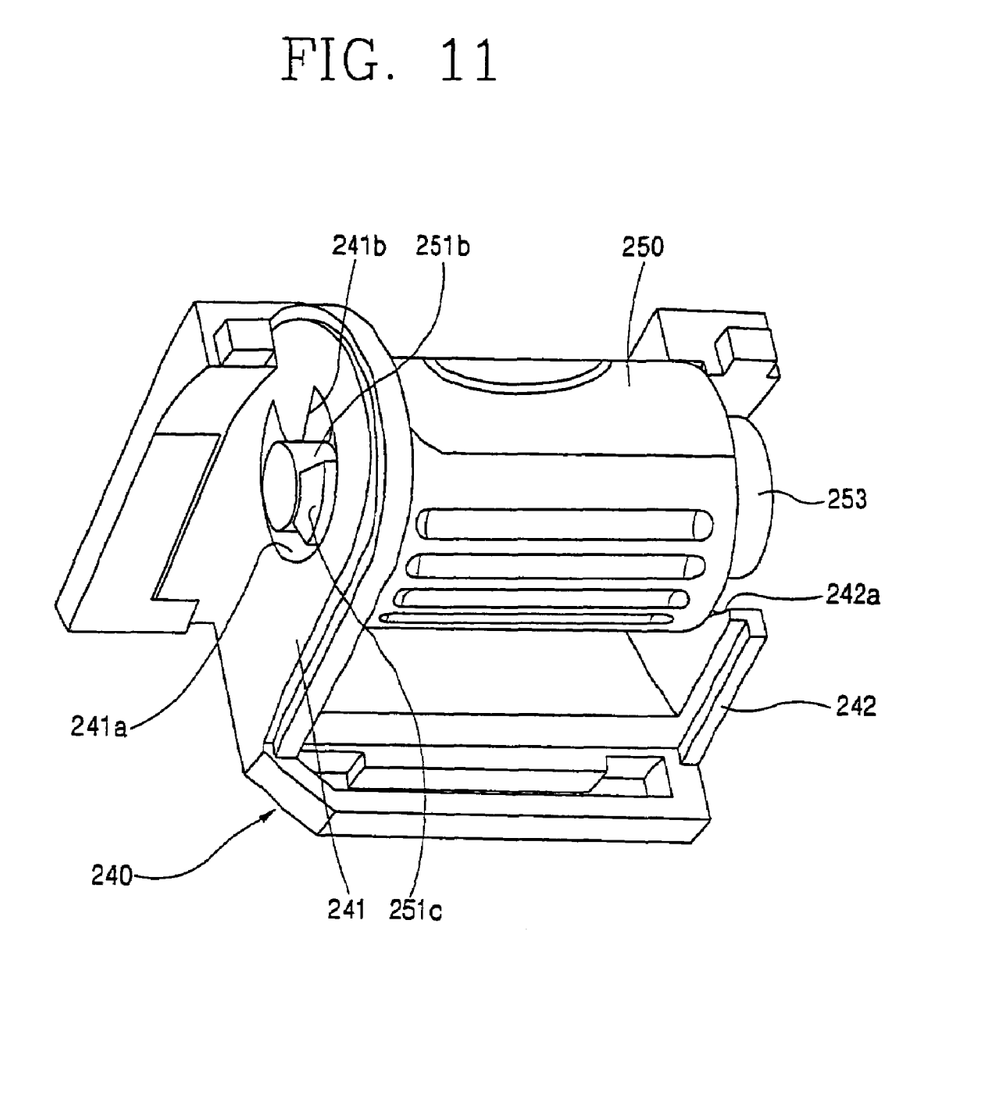
FIG. 11 is a perspective view for explaining a stopper of a supporting member and a jaw of a camera housing in the camera assembly of the mobile communication device according to an example embodiment of the present invention.

When the camera 250 is rotated, a jaw 251c of the camera housing 251 may be stopped by the stopper 241b of the camera supporting member 240. Thus, the camera 250 may be rotated only within a preset angle range.

Figure 12:
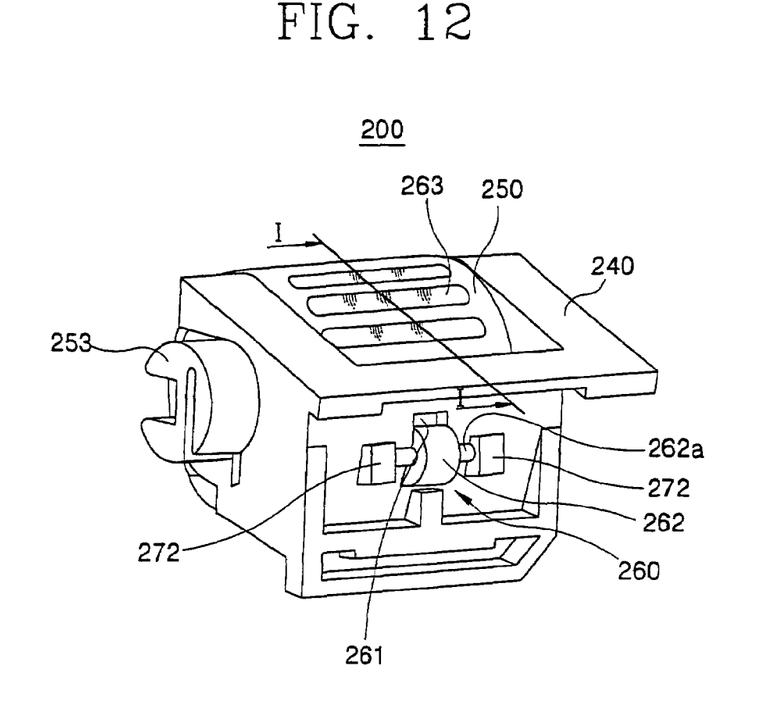
FIG. 12 is an engagement rear perspective view showing the camera assembly of the mobile communication device according to an example embodiment of the present invention.
Figure 13:
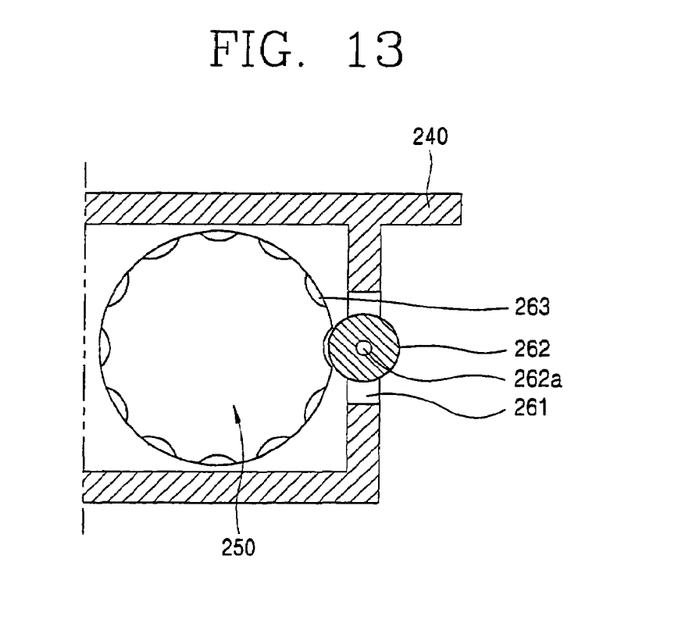
FIG. 13 is a sectional view taken along line I-I of FIG. 12.

The camera rotation angle maintaining device 260 may include an opening portion 261 formed at the camera supporting member 240 and a pressurizing roller 262 having an axial member 262a installed at the opening portion 261. The pressurizing roller 262 may be pressurized against an outer circumferential surface of the camera 250.

The axial member 262a may be supported at both ends by supporting members 272. The axial member 262a may include one axial member supported by both supporting members 272 or the axial member 262a may include two axial members on either side of the pressurizing roller 262 with each axial member being supported by one of the support members 272. The axial member 262a may rotate (along with the pressurizing roller 262) while being supported at the ends by the supporting members 272. Alternatively, the axial member 262a may be fixed to the supporting members 272 and the pressurizing roller 262 may rotate about the axial members 262a.

The opening portion 261 may be preferably formed at the rear surface of the camera supporting member 240. More specifically, the opening portion 261 may be formed near the camera 250.

The pressurizing roller 262 may include the axial member 262a installed at the opening portion 261, and a plurality of serrations 263 may be formed on the outer circumferential surface of the camera 250 so that the outer circumferential surface of the pressurizing roller 262 can be adhered thereto.

The serrations 263 may be uniformly formed in the longitudinal direction of the camera 250. The pressuring roller 262 may be preferably formed of a rubber material so that the camera 250 can be smoothly rotated and may maintain a certain tension at the time of adjusting a rotation angle of the camera 250.

Operation of the camera assembly of the mobile communication device according to example embodiments of the present invention will be explained with reference to FIGS. 10 to 13.

When the user rotates the camera 250 to a desired angle in order to adjust a rotation angle of the camera 250, the camera 250 is rotated with a certain angle centering around (or about) the rotational shaft 251b. At this time, since the outer circumferential surface of the pressurizing roller 262 of rubber material adheres to the serrations 263, the camera 250 is rotated slowly, smoothly and maintains a certain angle and a certain tension. Accordingly, a rotation angle of the camera 250 can be adjusted more precisely and accurately and the rotational angle of the camera 250 may be maintained as it is, even after adjustment by the user.

Accordingly, the camera may be slowly and smoothly rotated and to maintain a certain angle and a certain tension when the user adjusts the rotation angle of the camera. Accordingly, the rotation angle of the camera can be precisely and minutely adjusted, and the rotation angle can be maintained without a change even after adjustment by the user. Thus, the user can precisely photograph the desired image and enhance the reliability of the product.

Embodiments of the present invention may be embodied in several forms without departing from the spirit or essential characteristics thereof. It should also be understood that the above-described embodiments are not limited by any of the details of the foregoing description, but rather should be construed broadly within its spirit and scope as defined in the appended claims. Therefore, all changes and modifications that fall within the metes and bounds of the claims, or equivalence of such metes and bounds are therefore intended to be embraced by the appended claims.

What is claimed is:

1. A rotary camera assembly comprising:
    a camera supporting member installed at a side of a mobile communication device;
    a camera rotatably installed in the camera supporting member; and a camera rotation angle maintaining device to maintain a rotation angle of the camera, wherein the camera rotation angle maintaining device comprises:
- an opening portion formed at the camera supporting member; and
- a pressurizing roller rotatably axially installed at the opening portion to be pressurized against an outer circumferential surface of the camera.

2. The rotary camera assembly of claim 1, wherein the camera includes a plurality of serrations formed at an outer circumferential surface of the camera.

3. The rotary camera assembly of claim 2, wherein the serrations are uniformly formed in a longitudinal direction of the camera.

4. The rotary camera assembly of claim 2, wherein the pressurizing roller is formed of a rubber material.

5. A mobile communication device comprising:
- a camera supporting device to support a camera; and
- a camera maintaining device to maintain a rotational angle of the camera relative to the camera supporting device, wherein the camera maintaining device comprises a pressurizing roller at an opening portion of the camera supporting device, the pressurizing roller to be pressurized against an outer surface of the camera.

6. The mobile communication device of claim 5, wherein the camera includes a plurality of serrations formed at the outer surface of the camera.

7. The mobile communication device of claim 6, wherein the serrations are uniformly formed in a longitudinal direction of the camera.

8. A mobile communication device comprising:
- a first body;
- a second body; and
- a hinge portion coupling the first body and the second body, the hinge portion including a camera and a device to maintain a rotational angle of the camera, wherein the device to maintain the rotational angle comprises a pressurizing roller at an opening portion of a camera support device, the pressurizing roller to be pressurized against a surface of the camera.

9. The mobile communication device of claim 8, wherein the camera support device to support the camera.

* * * * *